(12) United States Patent
Bender (10) Patent No.: US 7,390,599 B2
(45) Date of Patent: Jun. 24, 2008

(54) SILICON-CONTAINING OVERCOAT LAYERS

(75) Inventor: Timothy P. Bender, Toronto (CA)

(73) Assignee: Xerox Corporation, Norwalk, CT (US)

( * ) Notice: Subject to any disclaimer, the term of this patent is extended or adjusted under 35 U.S.C. 154(b) by 241 days.

(21) Appl. No.: 11/246,127

(22) Filed: Oct. 11, 2005

(65) Prior Publication Data

US 2007/0082207 A1    Apr. 12, 2007

(51) Int. Cl.
G03G 15/04 (2006.01)
(52) U.S. Cl. ............... 430/58.2; 399/159; 428/447; 528/29; 528/43
(58) Field of Classification Search .............. None
See application file for complete search history.

(56) References Cited

U.S. PATENT DOCUMENTS

| | | | |
|---|---|---|---|
| 4,265,990 A | | 5/1981 | Stolka et al. |
| 5,614,603 A | * | 3/1997 | Harkness et al. ............ 528/14 |
| 6,517,984 B1 | * | 2/2003 | Ferrar et al. ............ 430/58.2 |
| 6,730,448 B2 | | 5/2004 | Yoshino et al. |
| 2001/0044060 A1 | * | 11/2001 | Shida et al. ............ 430/58.2 |
| 2004/0086794 A1 | | 5/2004 | Yamada et al. |
| 2004/0242830 A1 | * | 12/2004 | Frohlich et al. ............ 528/32 |
| 2006/0058483 A1 | * | 3/2006 | Zha et al. ............ 528/14 |
| 2006/0210811 A1 | * | 9/2006 | Nemeth et al. ............ 428/447 |

FOREIGN PATENT DOCUMENTS

| | | | |
|---|---|---|---|
| JP | A-57-128344 | | 8/1982 |
| JP | B-60-022347 | | 6/1985 |
| JP | A-63-065449 | | 3/1988 |
| JP | A-04-015659 | | 1/1992 |
| JP | B-05-047104 | | 7/1993 |
| JP | 8-319353 | * | 12/1996 |
| WO | WO 2004/050744 | * | 6/2004 |

OTHER PUBLICATIONS

Translation of JP 8-319353 into English, Dec. 3, 1996.*
U.S. Appl. No. 10/998,585, filed Nov. 30, 2004, Bender et al.

* cited by examiner

Primary Examiner—Marc S Zimmer
(74) Attorney, Agent, or Firm—Oliff & Berridge, PLC (57) ABSTRACT

Silicon-containing layers that have been prepared by a sol-gel method and include sol-gel polymerization products of siloxane-containing compounds, disilanol compounds and alcohols are provided. Methods for preparing silicon-containing layers including sol-gel polymerization products of siloxane-containing compounds, disilanol compounds and alcohols are also provided. In addition, photoreceptors and image-forming apparatus including such silicon-containing layers are provided.

16 Claims, 3 Drawing Sheets

| No. | Ar¹ | Ar² | Ar³ & Ar⁴ | Ar⁵ | k | —S |
|---|---|---|---|---|---|---|
| V-1 | biphenyl | phenyl-S | — | phenyl-S | 0 | $-(CH_2)_2-COO-(CH_2)_3-Si(O^iPr)_3$ |
| V-2 | biphenyl | phenyl-S | — | phenyl-S | 0 | $-(CH_2)_2-COO-(CH_2)_3-SiMe(O^iPr)_2$ |
| V-3 | biphenyl | phenyl-S | — | phenyl-S | 0 | $-(CH_2)_2-COO-(CH_2)_3-SiMe_2(O^iPr)$ |
| V-4 | dimethylphenyl | biphenyl-S | — | biphenyl-S | 0 | $-(CH_2)_2-COO-(CH_2)_3-Si(O^iPr)_3$ |
| V-5 | dimethylphenyl | biphenyl-S | — | biphenyl-S | 0 | $-(CH_2)_2-COO-(CH_2)_3-SiMe(O^iPr)_2$ |
| V-6 | dimethylphenyl | biphenyl-S | — | biphenyl-S | 0 | $-(CH_2)_2-COO-(CH_2)_3-SiMe_2(O^iPr)$ |
| V-7 | phenyl-S | phenyl-S | — | phenyl-S | 0 | $-(CH_2)_2-COO-(CH_2)_3-Si(O^iPr)_3$ |
| V-8 | phenyl-S | phenyl-S | — | phenyl-S | 0 | $-(CH_2)_2-COO-(CH_2)_3-SiMe(O^iPr)_2$ |
| V-9 | phenyl-S | phenyl-S | — | phenyl-S | 0 | $-(CH_2)_2-COO-(CH_2)_3-SiMe_2(O^iPr)$ |
| V-10 | biphenyl-S | biphenyl-S | — | biphenyl-S | 0 | $-(CH_2)_2-COO-(CH_2)_3-Si(O^iPr)_3$ |
| V-11 | biphenyl-S | biphenyl-S | — | biphenyl-S | 0 | $-(CH_2)_2-COO-(CH_2)_3-SiMe(O^iPr)_2$ |
| V-12 | biphenyl-S | biphenyl-S | — | biphenyl-S | 0 | $-(CH_2)_2-COO-(CH_2)_3-SiMe_2(O^iPr)$ |

FIG. 4

SILICON-CONTAINING OVERCOAT LAYERS

BACKGROUND

This disclosure relates generally to processes for the formation of silicon-containing overcoat layers, and to the use of such silicon-containing overcoat layers in electrophotographic imaging members. In particular, this disclosure provides a method for producing silicon-containing overcoat layers by sol-gel processes including disilanol compounds.

In electrophotography, an electrophotographic substrate containing a photoconductive insulating layer on a conductive layer is imaged by first uniformly electrostatically charging a surface of the substrate. The substrate is then exposed to a pattern of activating electromagnetic radiation, such as, for example, light. The light or other electromagnetic radiation selectively dissipates the charge in illuminated areas of the photoconductive insulating layer while leaving behind an electrostatic latent image in non-illuminated areas of the photoconductive insulating layer. This electrostatic latent image is then developed to form a visible image by depositing finely divided electroscopic marking particles on the surface of the photoconductive insulating layer. The resulting visible image is then transferred from the electrophotographic substrate to a necessary member, such as, for example, an intermediate-transfer member or a print substrate, such as paper. This image-developing process can be repeated as many times as necessary with reusable photoconductive insulating layers.

Image-forming apparatus such as copiers, printers and facsimiles, including electrophotographic systems for charging, exposure, development, transfer, etc., using electrophotographic photoreceptors have been widely employed. In such image-forming apparatus, there are ever-increasing demands for improving the speed of the image-forming processes, improving image quality, miniaturizing and prolonging the life of the apparatus, reducing production and running costs, etc. Further, with recent advances in computers and communication technology, digital systems and color-image output systems have been applied also to image-forming apparatus.

Electrophotographic imaging members (i.e. photoreceptors) are well known. Photoreceptors having either a flexible belt or a rigid drum configuration are commonly used in electrophotographic processes. Photoreceptors may comprise a photoconductive layer including a single layer or composite layers. These photoreceptors take many different forms. For example, layered photoresponsive imaging members are known in the art. U.S. Pat. No. 4,265,990 to Stolka et al., which is incorporated herein by reference in its entirety, describes a layered photoreceptor having separate photogenerating and charge-transport layers. The photogenerating layer disclosed in the 990 patent is capable of photogenerating holes and injecting the photogenerated holes into the charge-transport layer. Thus, in the photoreceptors of the 990 patent, the photogenerating material generates electrons and holes when subjected to light.

More advanced photoconductive photoreceptors containing highly specialized component layers are also known. For example, multi-layered photoreceptors may include one or more of a substrate, an undercoat layer, an intermediate layer, an optional hole- or charge-blocking layer, a charge-generating layer (including a photogenerating material in a binder) over an undercoating layer and/or a blocking layer, and a charge-transport layer (including a charge-transport material in a binder). Additional layers, such as one or more overcoat layer or layers, may be included as well.

In view of such a background, improvement in electrophotographic properties and durability, miniaturization, reduction in cost, etc., in photoreceptors have been studied, and photoreceptors using various materials have been proposed.

For example, JP-A-63-065449 (the term "JP-A" as used herein means an "unexamined published Japanese patent application"), discloses photoreceptors in which fine silicone particles are added to a photosensitive layer, and also discloses that such addition of the fine silicone particles imparts lubricity to a surface of the photoreceptor.

Further, in forming a photosensitive layer, a method has been proposed in which a charge-transfer substance is dispersed in a binder polymer or a polymer precursor thereof, and then the binder polymer or the polymer precursor thereof is cured. JP-B-05-047104 (the term "JP-B" as used herein means an "examined Japanese patent publication") and JP-B-60-022347, disclose photoreceptors using silicone materials as the binder polymers or the polymer precursors thereof.

Furthermore, in order to improve mechanical strength of the photoreceptor, a protective layer is formed on the surface of the photosensitive layer in some cases. Often, a cross-linkable resin is used as a material for the protective layer. However, protective layers formed by cross-linkable resin act as insulating layers, which impair the photoelectric characteristics of the photoreceptor. For this reason, a method of dispersing a fine conductive metal oxide powder, as disclosed in JP-A-57-128344, or a charge-transfer substance, as disclosed in JP-A-04-015659, in the protective layer and a method of reacting a charge-transfer substance having a reactive functional group with a thermoplastic resin to form the protective layer have been proposed.

However, even the above-mentioned conventional photoreceptors are not necessarily sufficient in electrophotographic characteristics and durability, particularly when used in combination with a charger of the contact-charging system (contact charger) or a cleaning apparatus, such as a cleaning blade.

Further, when the photoreceptor is used in combination with the contact charger and a toner obtained by chemical polymerization (polymerization toner), image quality may be deteriorated due to a surface of the photoreceptor being stained with a discharge product produced in contact charging or the polymerization toner remaining after a transfer step. Still further, the use of a cleaning blade to remove discharge product or remaining toner from the surface of the photoreceptor involves friction and abrasion between the surface of the photoreceptor and the cleaning blade, which tends to damage the surface of the photoreceptor, break the cleaning blade or turn up the cleaning blade.

The use of silicon-containing compounds in photoreceptor layers, including in photosensitive and protective layers, has been shown to increase the mechanical lifetime of photoreceptors, under charging conditions and scorotron-charging conditions. For example, U.S. Patent Application Publication No. 2004/0086794 to Yamada et al., which is incorporated herein by reference in its entirety, discloses a photoreceptor having improved mechanical strength and stain resistance.

Photoreceptors having low wear rates, such as those described in U.S. Patent Application Publication No. 2004/0086794, also have low refresh rates. Low wear and refresh rates are a primary cause of image-deletion errors, particularly under conditions of high humidity and high temperature. U.S. Pat. No. 6,730,448 to Yoshino et al., which is incorporated herein by reference in its entirety, addresses this issue in its disclosure of photoreceptors having some improvement in image quality, fixing ability, even in an environment of high heat and humidity.

It has been determined that, in photoreceptors, deletion of a developed image can degrade the top-most surface of the photoreceptor. This deletion can occur when the photoreceptor is exposed to environmental contaminants, such as those typically found around the charging device of a xerographic engine. The image deletion can increase under conditions of high heat and/or high humidity.

In typical photoreceptors, where the outermost surface comprises a solid-state solution of a hole-transporting arylamine compound in a polymeric binder material, image-deletion can occur when the environmental contaminants around the charging device react with hole-transporting arylamine compounds to form highly conductive species.

However, in photoreceptors in which the outermost layer is a siloxane-organic hybrid material containing a hole-transporting arylamine moiety, image deletion can occur when the environmental contaminants around the charging device in the xerographic engine interact with the siloxane component of the siloxane-organic hybrid material. A chemical reaction by which residual alkoxides of the siloxane components hydrolyze to form highly polar silanol moieties can result from this interaction. These highly polar silanols, which reside on the outermost photoreceptor surface and both attract and retain environmental contaminants formed by the charging device, can cause highly conductive zones to form on the photoreceptor surface. In the presence of high heat and/or high humidity, these highly conductive zones can manifest as a deletion of the developed image.

Thus, the above-mentioned conventional photoreceptors are not necessarily sufficient in electrophotographic characteristics and durability, particularly when used in high-heat and/or high-humidity environments.

Thus, there still remains a need for photoreceptors having high mechanical strength and improved electrophotographic characteristics and improved image-deletion characteristics even under conditions of high temperature and high humidity.

SUMMARY

Silicon-containing layers for photoreceptors, in which the silicon-containing layers have high mechanical strength, improved electrophotographic characteristics and improved image deletion characteristics even under conditions of high temperature and high humidity are provided.

Separately provided are silicon-containing layer including sol-gel polymerization products of mixtures of siloxane precursor materials that include siloxane-containing compounds, disilanol compounds and alcohols.

Separately provided are sol-gel processes for preparing silicon-containing layer including sol-gel polymerization products of mixtures of siloxane precursor materials that include siloxane-containing compounds, disilanol compounds and alcohols.

Separately provided are photoreceptors including silicon-containing layers that include sol-gel polymerization products of mixtures of siloxane precursor materials that include siloxane-containing compounds, disilanol compounds and alcohols.

Separately provided are image-forming apparatuses that include photoreceptors including silicon-containing layers that include sol-gel polymerization products of mixtures of siloxane precursor materials that include siloxane-containing compounds, disilanol compounds and alcohols.

These and other features and advantages of various exemplary embodiments of materials, devices, systems and/or methods are described in, or are apparent from, the following detailed description of the various exemplary embodiments of the methods and systems.

DETAILED DESCRIPTION OF EMBODIMENTS

Exemplary embodiments will be described in detail below with reference to drawings in some cases. In the drawings, the same reference numerals and signs are used to designate the same or corresponding parts, and repeated descriptions are avoided.

Photoreceptor

In photoreceptors of embodiments, photosensitive layers may comprise one or more silicon-containing layers, and the silicon-containing layers may further contain resin.

In embodiments, the resin may be a resin soluble in a liquid component in a coating solution used for formation of this layer. Such a liquid-soluble resin may be selected based upon the liquid component employed. For example, if the coating solution contains an alcoholic solvent (such as methanol, ethanol or butanol), a polyvinyl acetal resin such as a polyvinyl butyral resin, a polyvinyl formal resin or a partially acetalized polyvinyl acetal resin in which butyral is partially modified with formal or acetoacetal, a polyamide resin, a cellulose resin such as ethyl cellulose and a phenol resin may be suitably chosen as the alcohol-soluble resins. These resins may be used either alone or as a combination of two or more of them. Of the above-mentioned resins, the polyvinyl acetal resin is used in some embodiments to obtain the benefits of its electric characteristics.

In embodiments, the weight-average molecular weight of the resin soluble in the liquid component may be from about 2,000 to about 1,000,000, and from about 5,000 to about 50,000. When the weight-average molecular weight is less than about 2,000, the effect of enhancing discharge-gas resistance, mechanical strength, scratch resistance, particle dispersibility, etc., tends to become insufficient. However, when the weight-average molecular weight exceeds about 1,000,000, the resin solubility in the coating solution decreases, and the amount of resin added to the coating solution may be limited and poor film formation in the production of the photosensitive layer may result.

Further, the amount of resin soluble in the liquid component may be, in embodiments, from about 0.1 to about 15% by weight, or from about 0.5 to about 10% by weight, based on the total amount of the coating solution. When the amount added is less than about 0.1% by weight, the effect of enhancing discharge-gas resistance, mechanical strength, scratch resistance, particle dispersibility, etc., may become insufficient. However, if the amount of the resin soluble in the liquid component exceeds about 15% by weight, there may be a tendency to form indistinct images when the photoreceptor is used at high temperature and high humidity.

As used herein, a "high-temperature environment" or "high-temperature conditions" refer to an atmosphere in which the temperature is at least about 28° C., such as about 28° C. to about 50° C. or to about 75° C. A "high-humidity environment" or "high-humidity conditions" refer to an atmosphere in which the relative humidity is at least about 75%, such as about 75% to about 90% or about 100%.

Silicon-containing compounds used in embodiments contain at least one silicon atom, but are otherwise not particularly limited. However, a compound containing two or more silicon atoms may be used in embodiments. The use of the compound containing two or more silicon atoms allows both the strength and image quality of the photoreceptor to be achieved at higher levels.

In embodiments, at least one member selected from silicon-containing compounds represented by formulas (2) to (4) and hydrolysates or hydrolytic condensates thereof may be used.

$$W^1(-SiR_{3-a}Q_a)_2 \tag{2}$$

$$W^2(-D-SiR_{3-a}Q_a)_b \tag{3}$$

$$SiR_{4-c}Q_c \tag{4}$$

In formulas (2) to (4), $W^1$ represents a divalent organic group, $W^2$ represents an organic group derived from a compound having hole-transport capability, R represents a member selected from the group consisting of a hydrogen atom, an alkyl group and a substituted or unsubstituted aryl group, Q represents a hydrolytic group, D represents a divalent group, a represents an integer of 1 to 3, b represents an integer of 2 to 4, and c represents an integer of 1 to 4.

R in formulas (2) to (4) represents a hydrogen atom, an alkyl group, such as a $C_1$-$C_5$ alkyl group, or a substituted or unsubstituted aryl group, such as a substituted or unsubstituted $C_6$-$C_{15}$ aryl group, as described above.

Further, the hydrolytic group represented by Q in formulas (2) to (4) means a functional group which can form a siloxane bond (O—Si—O) by hydrolysis in the curing reaction of the compound represented by any one of formulas (2) to (4). Non-limiting examples of the hydrolytic groups that may be used in embodiments include a hydroxyl group, an alkoxyl group, a methyl ethyl ketoxime group, a diethylamino group, an acetoxy group, a propenoxy group and a chloro group. In particular embodiments, a group represented by —OR", in which R" represents a $C_1$-$C_{15}$ alkyl group or a trimethylsilyl group, may be used.

In formula (3), the divalent group represented by D may be, in embodiments, a divalent hydrocarbon group represented by —$C_nH_{2n}$—, —$C_nH_{2n-2}$—, —$C_nH_{2n-4}$— (n is an integer of 1 to about 15, such as from 2 to about 10, —$CH_2$—$C_6H_4$— or —$C_6H_4$—$C_6H_4$—, an oxycarbonyl group (—COO—), a thio group (—S—), an oxy group (—O—), an isocyano group (—N=CH—) or a divalent group in which two or more of them are combined. The divalent group may have a substituent group such as an alkyl group, a phenyl group, an alkoxyl group or an amino group on its side chain. In embodiments in which D is one of the above-mentioned divalent groups, proper flexibility may be imparted to an organic silicate skeleton, thereby tending to improve the strength of the layer.

Non-limiting examples of compounds representable by formula (2) include disiloxane compounds, such as those shown in Table 1. As used herein, "Me" indicates a methyl (—$CH_3$) group; "OMe" indicates a methoxy (—$OCH_3$) group; "Et" indicates an ethyl (—$CH_2CH_3$) group; "OEt" indicates an ethoxy (—$OCH_2CH_3$) group; "i-Pr" indicates an isopropyl (—$CH(CH_3)_2$) group; "O-i-Pr" indicates an isopropoxy (—$OCH(CH_3)_2$) group.

TABLE 1

| No. | Structural Formula |
|---|---|
| III-1 | (MeO)$_3$Si—(CH$_2$)$_2$—Si(OMe)$_3$ |
| III-2 | (MeO)$_2$Me—(CH$_2$)$_2$—SiMe(OMe)$_2$ |
| III-3 | (MeO)$_2$MeSi—(CH$_2$)$_6$—SiMe(OMe)$_2$ |
| III-4 | MeO)$_3$Si—(CH$_2$)$_6$—Si(OMe)$_3$ |
| III-5 | (EtO)$_3$Si—(CH$_2$)$_6$—Si(OEt)$_3$ |
| III-6 | (MeO)$_2$MeSi—(CH$_2$)$_{10}$—SiMe(OMe)$_2$ |
| III-7 | (MeO)$_3$Si—(CH$_2$)$_3$—NH—(CH$_2$)$_3$—Si(OMe)$_3$ |
| III-8 | (MeO)$_3$Si—(CH$_2$)$_3$—NH—(CH$_2$)$_2$—NH—(CH$_2$)$_3$—Si(OMe)$_3$ |

III-9

(MeO)$_3$Si—⟨phenyl⟩—Si(OMe)$_3$

III-10

(MeO)$_2$MeSi—⟨phenyl⟩—SiMe(OMe)$_2$

III-11

(EtO)$_3$Si—⟨phenyl⟩—Si(OEt)$_3$

III-12

(MeO)$_3$Si—⟨phenyl⟩—⟨phenyl⟩—Si(OMe)$_3$

III-13

(MeO)$_2$MeSi—⟨phenyl⟩—⟨phenyl⟩—SiMe(OMe)$_2$

TABLE 1-continued

No. Structural Formula

III-14

III-15 (MeO)$_3$SiC$_3$H$_6$—O—CH$_2$CH{—O—C$_3$H$_6$Si(OMe)$_3$}—CH$_2${—O—C$_3$H$_6$Si(OMe)$_3$}
III-16 (MeO)$_3$SiC$_2$H$_4$—SiMe$_2$—O—SiMe$_2$—O—SiMe$_2$—C$_2$H$_4$Si(OMe)$_3$

Further, in formula (3), $W^2$ is not particularly limited. However, in particular embodiments, $W^2$ may be an organic group represented by formula (6):

(6)

wherein $Ar^1$, $Ar^2$, $Ar^3$ and $Ar^4$, which may be the same or different, each represents a substituted or unsubstituted aryl group, $Ar^5$ represents a substituted or unsubstituted aryl or arylene group, k represents 0 or 1, and at least one of $Ar^1$ to $Ar^5$ has a bonding hand to connect with -D-SiR$_{3-a}$Q$_a$ in formula (3).

Figure 4:
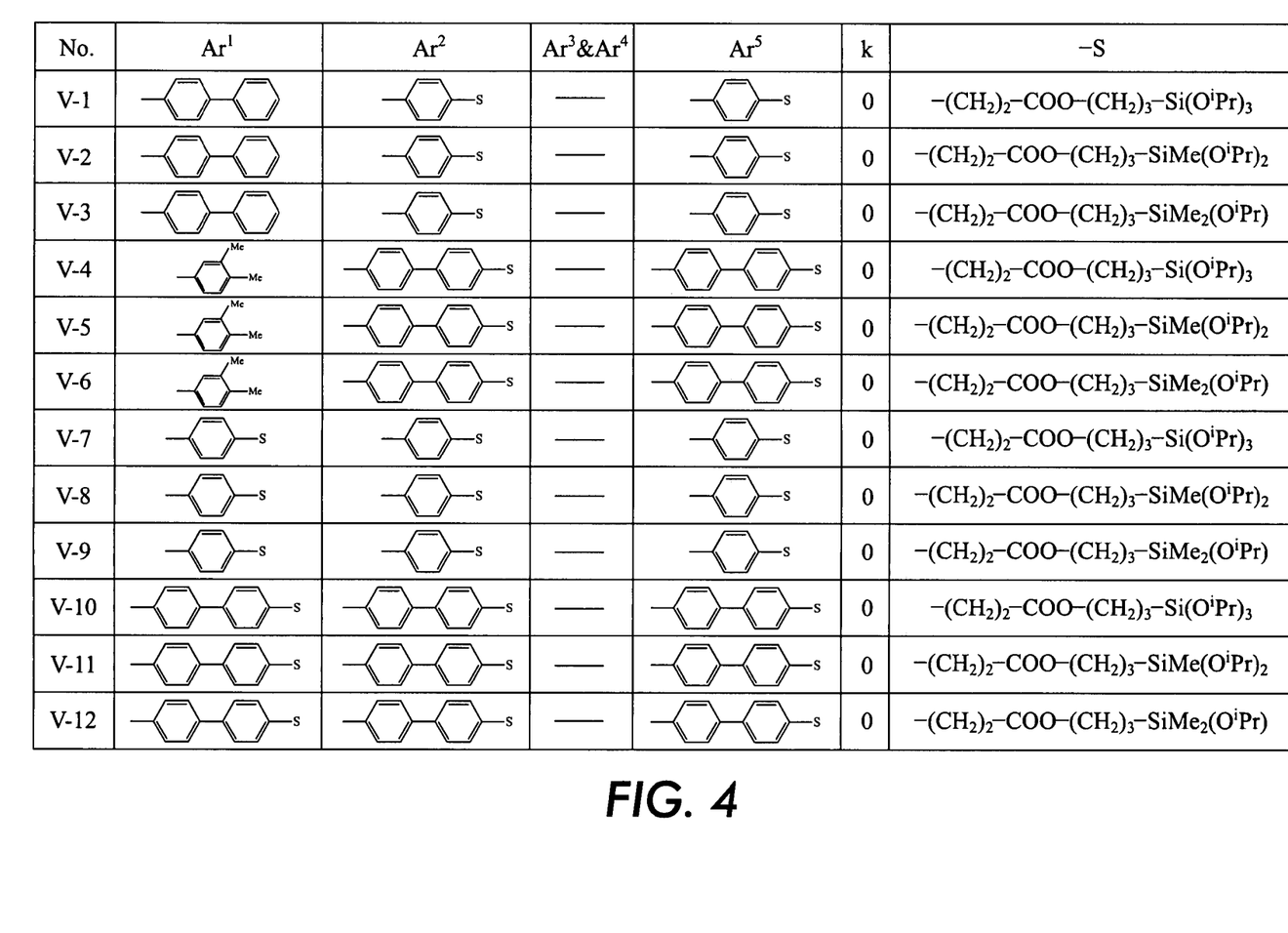
FIG. 4 sets forth exemplary siloxane-containing arylamine compounds.

Combinations of $Ar^1$, $Ar^2$, $Ar^3$, $Ar^4$, $Ar^5$ and integer k in formula (6) and a group represented by -D-SiR$_{3-a}$Q$_a$ in formula (3) include the particular exemplary embodiments shown in FIG. 4; additional exemplary embodiments can be found in U.S. Patent Application Publication No. 2004/0086794, U.S. Pat. No. 6,730,448 and in U.S. patent application Ser. No. 10/998,585, entitled "Silicon-Containing Layers for Electrophotographic Photoreceptors and Methods for Making the Same," the entire disclosures of which are incorporated herein by reference. As used in FIG. 4, S represents -D-SiR$_{3-a}$Q$_a$ linked to $Ar^1$ to $Ar^5$.

Further, in embodiments, the silicon-containing compounds represented by formula (4) may include silane coupling agents such as monofunctional alkoxysilanes (c=1) such as trimethylmethoxysilane; bifunctional alkoxysilanes (c=2) such as dimethyldimethoxysilane, diphenyldimethoxysilane or methylphenyl-dimethoxysilane; trifunctional alkoxysilanes (c=3) such as methyltrimethoxysilane, methyltriethoxysilane, ethyltrimethoxysilane, methyltrimethoxyethoxysilane, vinyltrimethoxysilane, vinyltriethoxysilane, phenyltrimethoxysilane, γ-glycidoxy-propylmethyldiethoxysilane, γ-glycidoxypropyltrimethoxysilane, γ-glycidoxypropyltriethoxysilane, γ-aminopropyltriethoxysilane, γ-aminopropyltrimethoxysilane, γ-aminopropylmethyldimethoxysilane, N-β-(aminoethyl)-γ-aminopropyltriethoxy-silane, (tridecafluoro-1,1,2,2-tetrahydrooctyl)triethoxysilane, (3,3,3-trifluoropropyl)-trimethoxysilane, 3-(heptafluoroisopropoxy)propyltriethoxysilane, 1H,1H,2H,2H-perfluoroalkyltriethoxysilane, 1H,1H,2H,2H-perfluorodecyltriethoxysilane or 1H,1H,2H,2H-perfluorooctyltriethoxysilane; and tetrafunctional alkoxysilanes (c=4) such as tetramethoxysilane or tetraethoxysilane.

In order to improve the strength of the photosensitive layer, trifunctional and tetrafunctional alkoxysilanes may be used in embodiments, and in order to improve the flexibility and film-forming properties, monofunctional and bifunctional alkoxysilanes may be used in embodiments.

Silicone hard-coating agents containing these coupling agents can also be used in embodiments. Commercially available hard-coating agents include KP-85, X-40-9740 and X-40-2239 (available from Shinetsu Silicone Co., Ltd.), and AY42-440, AY42-441 and AY49-208 (available from Toray Dow Corning Co., Ltd.).

In embodiments, the silicon-containing layer may contain one or more of the silicon-containing compounds represented by formulas (2) to (4). Further, the compounds represented by formulas (2) to (4) may include monofunctional compounds (in which a or c is 1), bifunctional compounds (in which a or c is 2), trifunctional compounds (in which a or c is 3) and/or tetrafunctional compounds (in which a or c is 4). However, in particular embodiments, the number of silicon atoms derived from the silicon-containing compounds represented by formulas (2) to (4) in the silicon-containing layer satisfies equation (7):

$$(N_{a=3}+N_{c\geq 3})/N_{total} \leq 0.5 \quad (7)$$

wherein $N_{a=3}$ represents the number of silicon atoms derived from —SiR$_{3-a}$Q$_a$ of the silicon-containing compounds represented by formula (2) or (3), in which a is 3; $N_{c\geq 3}$ represents the number of silicon atoms derived from the silicon-containing compounds represented by formula (4) in which c is 3 or 4; and $N_{total}$ represents the total of the number of silicon atoms derived from —SiR$_{3-a}$Q$_a$ of the silicon-containing compounds represented by formula (2) or (3) and the number of silicon atoms derived from the silicon-containing compounds represented by formula (4). That is, the ratio of silicon-containing compounds contained is set so that the number of silicon atoms derived from trifunctional and/or tetrafunctional compounds becomes 0.5 or less based on the number of silicon atoms derived from the silicon-containing compounds represented by formulas (2) to (4) (for compounds represented by formula (2) or (3), silicon atoms are limited to those derived from —SiR$_{3-a}$Q$_a$, and the same applies hereinafter). When the value of the left side of equation (7) exceeds 0.5, indistinct images may occur at high temperature and high humidity. When the value of the left side of equation (7) is decreased, a decrease in strength may also result. However, the use of silicon-containing compounds having two or more silicon atoms in its molecule can improve the strength.

In order to further improve the stain-adhesion resistance and lubricity of embodiments of photoreceptors, various fine particles can also be added to the silicon-containing layer. Non-limiting examples of the fine particles include fine particles containing silicon, such as fine particles containing silicon as a constituent element, and specifically include colloidal silica and fine silicone particles. Fine particles may be used either alone or as a combination of two or more of such fine particles.

Colloidal silica used in embodiments as the fine particles containing silicon may be selected from acidic or alkaline aqueous dispersions of fine particles having an average particle size of about 1 to about 100 nm, or about 10 to about 30 nm, and dispersions of fine particles in organic solvents, such as an alcohol, a ketone or an ester. In general, commercially available particles may be used. There is no particular limitation on the solid content of colloidal silica in a top surface layer of photoreceptors of embodiments. However, in embodiments, colloidal silica is used within the range of from about 1 to about 50% by weight, such as in a range of from about 5 to about 30% by weight, based on the total solid content of the top-surface layer, in terms of film-forming properties, electric characteristics and strength.

Fine silicone particles that may be used as fine particles containing silicon in embodiments may be selected from silicone resin particles, silicone rubber particles and silica particles surface-treated with silicone. Such particles may be spherical and may have an average particle size in a range of from about 1 to about 500 nm, such as from about 10 to about 100 nm. In general, commercially available particles may be used in embodiments.

In embodiments, the fine silicone particles are small-sized particles that are chemically inactive and excellent in dispersibility in a resin, and further are low in content as may be necessary for obtaining sufficient characteristics. Accordingly, the surface properties of exemplary photoreceptors can be improved without inhibition of the cross-linking reaction. That is, fine silicone particles improve the lubricity and water repellency of photoreceptor surfaces where incorporated into strong cross-linked structures, which may then be able to maintain good wear resistance and stain-adhesion resistance for a long period of time. The content of the fine silicone particles in the silicon-containing layer of embodiments may be within the range of from about 0.1 to about 20% by weight, such as from about 0.5 to about 10% by weight, based on the total solid content of the silicon-containing layer.

Other fine particles that may be used in embodiments include fine fluorine-based particles, such as ethylene tetrafluoride, ethylene trifluoride, propylene hexafluoride, vinyl fluoride and vinylidene fluoride, and semiconductive metal oxides such as $ZnO—Al_2O_3$, $SnO_2—Sb_2O_3$, $In_2O_3—SnO_2$, $ZnO—TiO_2$, $MgO—Al_2O_3$, $FeO—TiO_2$, $TiO_2$, $SnO_2$, $In_2O_3$, $ZnO$ and $MgO$.

In conventional photoreceptors, when such fine particles are contained in the photosensitive layer, the compatibility of the fine particles with a charge-transfer substance or a binding resin may become insufficient, which causes layer separation in the photosensitive layer, and thus forms an opaque film. As a result, the electric characteristics have deteriorated in some cases. In contrast, the silicon-containing layer of embodiments, such as for example a charge-transfer layer, may contain the resin soluble in the liquid component in the coating solution used for formation of this layer and the silicon-containing compound, thereby improving the dispersibility of the fine particles in the silicon-containing layer. Accordingly, the pot life of the coating solution can be sufficiently prolonged, and it becomes possible to prevent deterioration of the electric characteristics.

Further, an additive such as a plasticizer, a surface modifier, an antioxidant, or an agent for preventing deterioration by light may also be included in the silicon-containing layer of embodiments. Non-limiting examples of plasticizers that may be used in embodiments include, for example, biphenyl, biphenyl chloride, terphenyl, dibutyl phthalate, diethylene glycol phthalate, dioctyl phthalate, triphenylphosphoric acid, methylnaphthalene, benzophenone, chlorinated paraffin, polypropylene, polystyrene and various fluorohydrocarbons.

The antioxidants may include an antioxidant having a hindered-phenol, hindered-amine, thioether or phosphite partial structure. Suitible antioxidants include antioxidants having hindered-phenol, hindered-amine, thioether or phosphite partial structures, which may improve potential stability and image quality in environmental variation. Suitable hindered-phenol antioxidants for use in embodiments include butylated hydroxytoluenes (such as 2,6-di-tert-butyl-4-methylphenol or BHT), SUMILIZER BHT-R, SUMILIZER MDP-S, SUMILIZER BBM-S, SUMILIZER WX-R, SUMILIZER NW, SUMILIZER BP-76, SUMILIZER BP-101, SUMILIZER GA-80, SUMILIZER GM and SUMILIZER GS (available from Sumitomo Chemical Co., Ltd.); IRGANOX 1010, IRGANOX 1035, IRGANOX 1076, IRGANOX 1098, IRGANOX 1135, IRGANOX 1141, IRGANOX 1222, IRGANOX 1330, IRGANOX 1425WLj, IRGANOX 1520Lj, IRGANOX 245, IRGANOX 259, IRGANOX 3114, IRGANOX 3790, IRGANOX 5057 and IRGANOX 565 (available from Ciba Specialty Chemicals); and ADECASTAB AO-20, ADECASTAB AO-30, ADECASTAB AO-40, ADECASTAB AO-50, ADECASTAB AO-60, ADECASTAB AO-70, ADECASTAB AO-80 and ADECASTAB AO-330i (available from Asahi Denka Co., Ltd.). Suitable hindered-amine antioxidants that may be used in embodiments include SANOL LS2626, SANOL LS765, SANOL LS770, SANOL LS744, TINUVIN 144, TINUVIN 622LD, MARK LA57, MARK LA67, MARK LA62, MARK LA68, MARK LA63 and SUMILIZER TPS; and suitable phosphite antioxidants that may be used in embodiments include MARK 2112, MARK PEP-8, MARK PEP-24G, MARK PEP-36, MARK 329K and MARK HP-10. In particular embodiments, the antioxidant is one or more antioxidant chosen from hindered-phenol and hindered-amine antioxidants.

A siloxane-containing antioxidant may also be incorporated into the silicon-containing layer of embodiments. In certain embodiments, the siloxane-containing antioxidant may be wholly or at least partially located in the siloxane region of the silicon-containing layer. The siloxane-containing antioxidants may include any siloxane-containing antioxidant having a hindered-phenol, hindered-amine, thioether or phosphite partial structure. Use of siloxane-containing antioxidants having a hindered-phenol, hindered-amine, thioether or phosphite partial structure, as described herein, has been found to drastically improve image-deletion characteristics even in long-term cycling under conditions of high humidity and high temperature. Suitable siloxane-containing antioxidants that may be used in accordance with embodiments can be found in U.S. patent application Ser. No. 10/998,585.

There is no particular limitation on the thickness of the silicon-containing layer, however, in embodiments, the silicon-containing layer may be in a range from about 2 to about 5 μm in thickness, such as about 2.7 to about 3.2 μm in thickness.

The photoreceptor of embodiments may be either a function-separation-type photoreceptor, in which a layer containing a charge-generation substance (charge-generation layer) and a layer containing a charge-transfer substance (charge-transfer layer) are separately provided, or a monolayer-type photoreceptor, in which both the charge-generation layer and the charge-transfer layer are contained in the same layer, as long as the photoreceptor of the particular embodiment has the photosensitive layer provided with the above-mentioned silicon-containing layer. The photoreceptor of embodiments will be described in greater detail below, taking the function-separation-type photoreceptor as an example.

Figure 1:
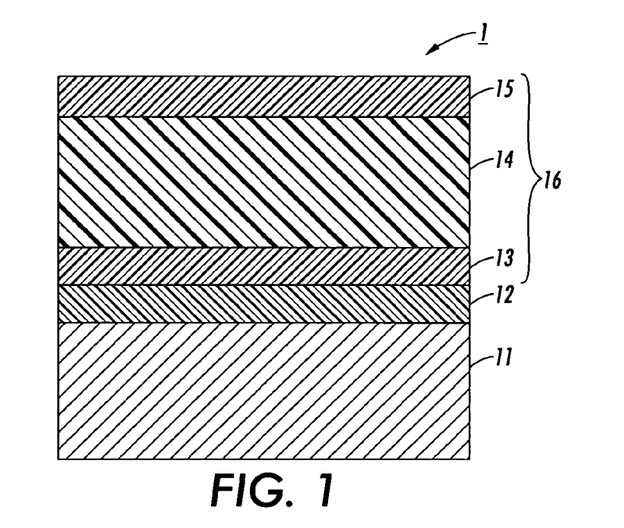
FIG. 1 is a schematic cross sectional view showing an embodiment of an electrophotographic photoreceptor.

FIG. 1 is a cross-sectional view schematically showing an embodiment of a photoreceptor. Photoreceptor 1 shown in FIG. 1 is a function-separation-type photoreceptor in which charge-generation layer 13 and charge-transfer layer 14 are separately provided. That is, underlayer 12, charge-generation layer 13, charge-transfer layer 14 and protective layer 15 are laminated onto conductive support 11 to form photosensitive layer 16. Protective layer 15 contains a resin soluble in the liquid component contained in the coating solution used for formation of this layer and the silicon compound.

Conductive support 11 may include, for example, a metal plate, a metal drum or a metal belt using a metal, such as aluminum, copper, zinc, stainless steel, chromium, nickel, molybdenum, vanadium, indium, gold, platinum or an alloy thereof; and paper or a plastic film or belt coated, deposited or laminated with a conductive polymer, a conductive compound such as indium oxide, or a metal such as aluminum, palladium, gold, or an alloy thereof. Further, surface treatment (such as anodic oxidation coating, hot water oxidation, chemical treatment, or coloring) or diffused reflection treatment (such as graining) can also be applied to a surface of support 11.

Binding resins used in underlayer 12 of embodiments may include but are not limited to, one or more polyamide resins, vinyl chloride resins, vinyl acetate resins, phenol resins, polyurethane resins, melamine resins, benzoguanamine resins, polyimide resins, polyethylene resins, polypropylene resins, polycarbonate resins, acrylic resins, methacrylic resins, vinylidene chloride resins, polyvinyl acetal resins, vinyl chloride-vinyl acetate copolymers, polyvinyl alcohol resins, water-soluble polyester resins, nitrocelluloses, caseins, gelatins, polyglutamic acids, starches, starch acetates, amino starches, polyacrylic acids, polyacrylamides, zirconium chelate compounds, titanyl chelate compounds, titanyl alkoxide compounds, organic titanyl compounds, silane coupling agents and mixtures thereof. Further, fine particles of titanium oxide, aluminum oxide, silicon oxide, zirconium oxide, barium titanate, a silicone resin or the like may be added to the above-mentioned binding resin in embodiments.

As a coating method in forming the underlayer of embodiments, any ordinary method, such as blade coating, Mayer bar coating, spray coating, dip coating, bead coating, air knife coating or curtain coating may be employed. The thickness of the underlayer may be from about 0.01 to about 40 μm in embodiments.

Non-limiting examples of charge-generation substances that may be contained in charge-generation layer 13 of embodiments include, but are not limited to, various organic pigments and organic dyes; such as azo pigments, quinoline pigments, perylene pigments, indigo pigments, thioindigo pigments, bisbenzimidazole pigments, phthalocyanine pigments, quinacridone pigments, quinoline pigments, lake pigments, azo lake pigments, anthraquinone pigments, oxazine pigments, dioxazine pigments, triphenylmethane pigments, azulenium dyes, squalium dyes, pyrylium dyes, triallylmethane dyes, xanthene dyes, thiazine dyes and cyanine dyes; and inorganic materials such as amorphous silicon, amorphous selenium, tellurium, selenium-tellurium alloys, cadmium sulfide, antimony sulfide, zinc oxide and zinc sulfide. In embodiments, cyclo-condensed aromatic pigments, perylene pigments and azo pigments may be used to impart sensitivity, electric stability and photochemical stability against irradiated light. These charge-generation substances may be used either alone or as a combination of two or more.

In embodiments, charge-generation layer 13 may be formed by vacuum deposition of the charge-generation substance or application of a coating solution in which the charge-generation substance is dispersed in an organic solvent containing a binding resin. The binding resins used in the charge-generation layer of embodiments include polyvinyl acetal resins such as polyvinyl butyral resins, polyvinyl formal resins or partially acetalized polyvinyl acetal resins in which butyral is partially modified with formal or acetoacetal, polyamide resins, polyester resins, modified ether type polyester resins, polycarbonate resins, acrylic resins, polyvinyl chloride resins, polyvinylidene chlorides, polystyrene resins, polyvinyl acetate resins, vinyl chloride-vinyl acetate copolymers, silicone resins, phenol resins, phenoxy resins, melamine resins, benzoguanamine resins, urea resins, polyurethane resins, poly-N-vinylcarbazole resins, polyvinylanthracene resins, polyvinylpyrene resins and mixtures thereof. In embodiments in which one or more of polyvinyl acetal resins, vinyl chloride-vinyl acetate copolymers, phenoxy resins or modified ether type polyester resins are used, the dispersibility of the charge-generation substance may be improved to cause no occurrence of coagulation of the charge-generation substance, and a coating solution that is stable for a long period of time may be obtained. The use of such a coating solution in embodiments makes it possible to form a uniform coating easily and surely. As a result, the electric characteristics may be improved, and image defects may be prevented. Further, the compounding ratio of the charge-generation substance to the binding resin may be, in embodiments, within the range of from about 5:1 to about 1:2 by volume ratio.

Further, the solvents used in preparing the coating solution of embodiments may include organic solvents such as methanol, ethanol, n-propanol, n-butanol, benzyl alcohol, methyl cellosolve, ethyl cellosolve, acetone, methyl ethyl ketone, cyclohexanone, chlorobenzene, methyl acetate, n-butyl acetate, dioxane, tetrahydrofuran, methylene chloride, chloroform and mixtures thereof.

Methods for applying the coating solution in embodiments include the coating methods described above with reference to the underlayer. The thickness of charge-generation layer 13 thus formed may be from about 0.01 to about 5 μm, such as from about 0.1 to about 2 μm. When the thickness of charge-generation layer 13 is less than about 0.01 μm, uniform layer formation may be difficult. On the other hand, when the thickness exceeds about 5 μm, the electrophotographic characteristics may significantly deteriorate.

Further, a stabilizer such as an antioxidant or an inactivating agent may also be added to charge-generation layer 13 in embodiments. Non-limiting examples of antioxidants that may be used include but are not limited to antioxidants such as phenolic, sulfur, phosphorus and amine compounds, as well as the antioxidant compounds described above. Inactivating agents that may be used in embodiments may include bis(dithiobenzyl)nickel and nickel di-n-butylthiocarbamate.

In embodiments, charge-transfer layer 14 can be formed by applying a coating solution containing the charge-transfer substance and a binding resin, and optionally fine particles, additives, etc., as described above.

Low molecular-weight charge-transfer substances that may be used in embodiments may include, for example, pyrene, carbazole, hydrazone, oxazole, oxadiazole, pyrazoline, arylamine, arylmethane, benzidine, thiazole, stilbene and butadiene compounds. In embodiments, high molecular-weight charge-transfer substances may be used and include, for example, poly-N-vinylcarbazoles, poly-N-vinylcarbazole halides, polyvinyl pyrenes, polyvinylanthracenes, polyvinylacridines, pyrene-formaldehyde resins, ethylcarbazole-formaldehyde resins, triphenylmethane polymers and polysilanes. Triphenylamine compounds, triphenylmethane compounds and benzidine compounds may be used in embodiments to promote mobility, stability and transparency to light. Further, silicon compound represented by formula (3) may also be used as charge-transfer substances in particular embodiments.

Other exemplary charge-transfer molecules include, but are not limited to, the various compounds identified above as the organic group $W^2$, which have hole-transport capability. In particular embodiments, the charge-transfer molecule may be the arylamine of formula (8):

(8)

As binding resins in embodiments, high molecular-weight polymers that can form an electrical insulating film may be used. For example, when polyvinyl acetal resins, polyamide resins, cellulose resins, phenol resins, etc., which are soluble in alcoholic solvents, are used, binding resins used together with these resins include polycarbonates, polyesters, methacrylic resins, acrylic resins, polyvinyl chlorides, polyvinylidene chlorides, polystyrenes, polyvinyl acetates, styrene-butadiene copolymers, vinylidene chloride-acrylonitrile copolymers, vinyl chloride-vinyl acetate copolymers, vinyl chloride-vinyl acetate-maleic anhydride copolymers, silicone resins, silicone-alkyd resins, phenol-formaldehyde resins, styrene-alkyd resins, poly-N-vinylcarbazoles, polyvinyl butyrals, polyvinyl formals, polysulfones, casein, gelatin, polyvinyl alcohols, phenol resins, polyamides, carboxymethyl celluloses, vinylidene chloride-based polymer latexes and polyurethanes. Of the above-mentioned high molecular-weight polymers, polycarbonates, polyesters, methacrylic resins and acrylic resins have excellent compatibility with the charge-transfer substance, solubility and strength.

Charge-transfer layer 14 of embodiments may further contain an additive such as a plasticizer, a surface modifier, an antioxidant or an agent for preventing deterioration by light.

The thickness of charge-transfer layer 14 may be, in embodiments, from about 5 to about 50 μm, such as from about 10 to about 40 μm. When the thickness of the charge-transfer layer is less than about 5 μm, charging becomes difficult. However, thicknesses exceeding about 50 μm result significant deterioration of the electrophotographic characteristics.

Protective layer 15 may contain, in embodiments, resins soluble in liquid components in coating solution used for formation of protective layers and silicon-containing compounds as described above. Protective layer 15 may further contain a lubricant or fine particles of silicone oils or fluorine materials, which can also improve lubricity and strength. Non-limiting examples of the lubricants that may be used in embodiments include the above-mentioned fluorine-based silane coupling agents. Fine particles to be dispersed in protective layer 15 of embodiments may include fine particles comprising resins obtained by copolymerizing fluororesins with hydroxyl group-containing monomers, as described in Proceedings of Lectures in the Eighth Polymer Material Forum, page 89, and semiconductive metal oxides, as well as the above-mentioned fine silicone particles and fine fluorine-based particles. The thickness of the protective layer may be, in embodiments, from about 0.1 to about 10 μm, such as from about 0.5 to about 7 μm.

In general, silicon-containing protective or overcoat layers are prepared by sol-gel polymerization of silicon-containing materials. However, after such sol-gel materials are cured, residual silicon-alkoxy bonds may be present at the layer surface. In particular, in photoreceptors in which the outermost layer is a siloxane-organic hybrid material containing a hole-transporting arylamine moiety, image deletion may occur when the environmental contaminants around the charging device in the xerographic engine interact with the siloxane component of the siloxane-organic hybrid material. A chemical reaction by which residual alkoxides of the siloxane components hydrolyze to form highly polar silanol moieties results from this interaction. These highly polar silanols, which reside on the outermost surface of the photoreceptor may both attract and retain environmental contaminants formed by the charging device and may cause highly conductive zones to form on the surface of the photoreceptor. In the presence of high heat and/or high humidity, these highly conductive zones can manifest as a deletion of the developed image, if there is sufficient steric clearance between the polar silanols and the environmental contaminants at the atomic level. It may therefore be possible to prevent the interaction of the silanols with the environmental contaminants by increasing the steric congestion around the silicon atom.

Sol-gel processes are generally known in the art, and can be applied to the present disclosure based on the known processes and the present disclosure. The organic-inorganic composite structure includes a glassy polymer, such as an inorganic silica polymer such as a silica glass structure. The glassy polymer is prepared by a solution-gelation (or "sol-gel") process during which hydrolysis, followed by condensation polymerization, of a silicon alkoxide, such as tetraethylorthosilicate (hereafter "TEOS"), takes place in the presence of water and an alcohol. The general process for forming sol-gels is taught, for example, in C. J. Brinker and G. Scherer, Sol-Gel Science: The Physics and Chemistry of Sol-Gel Processing (Academic Press, Boston, 1990), which is incorporated herein by reference. This two-step reaction process, which transforms a miscible one-phase liquid solution into a two-phase material, is called "sol-gel transition." Generally, the mixture is slow to hydrolyze. However, the hydrolysis rate is a function of the solution pH and, therefore, may be controlled by the addition of an acid or base as a catalyst. The reaction mixture can further include other materials, such as organic monomers or polymers or other additives, which can become either chemically bound into the glassy polymer network, or entrapped in the glassy polymer structure. According to the present invention, the glassy polymer network itself does not include any carbon atoms, although carbon atoms can be included in the overall structure, such as in pendant groups.

Sol-gel processes are generally known in the art, and can be applied to the present invention based on the known processes and the present disclosure. In sol-gel processes, a polymer is prepared by a solution-gelation (or "sol-gel") process during which hydrolysis, followed by condensation polymerization, of a silicon alkoxide takes place in the presence of water and an alcohol. The general process for forming sol-gels is taught, for example, in C. J. Brinker and G. Scherer, Sol-Gel Science: The Physics and Chemistry of Sol-Gel Processing (Academic Press, Boston, 1990), which is incorporated herein by reference. This two-step reaction process, which transforms a miscible one-phase liquid solution into a two-phase material, is called "sol-gel transition". Generally, the silicon alkoxide/water/alcohol mixture is slow to hydrolyze. However, the hydrolysis rate is a function of the solution pH and, therefore, may be controlled by the addition of an acid or base as a catalyst. The reaction mixture can further include other materials, such as organic monomers or polymers or other additives, which can become either chemically bound into the polymer network, or entrapped in the polymer structure.

However, in embodiments disclosed and contemplated herein, silicon-containing layers are prepared by sol-gel polymerization processes in which disilanol compounds replace all or at least a portion of water in the silicon-containing layer formulation, which allows the tendancy for severe image-deletion errors to be corrected, particularly under high-temperature, high-humidity conditions.

As suitable precursor sol-gel materials, any of the known or after-developed desirable materials can be used, including, but not limited to, the silicon-containing compounds and organic siloxane materials set forth above.

In embodiments, the silicon-containing layer coating formulation may also include disilanol compounds that may replace water in silicon-containing overcoat-layer formulations. In embodiments, disilanol compounds are present in amounts such that a ratio of disilanol compounds and water is from about 20:80 to about 100:0, such as from about 50:50 or from about 75:25 to about 90:10 or about 100:0. In embodiments, the silicon-containing layer coating formulation may be essentially free of water. As used herein, "essentially free of water" indicates that no water is added to the silicon-containing layer coating formulation.

Suitable disilanol compounds for use in embodiments include sterically hindered disilanol compounds, such as dialkyl disilanol compounds. Sterically hindered disilanol compounds tend to be less susceptible to chemical attack and to sorption of water and/or other contaminents. In particular, sterically hindered disilanol compounds may block silicon atoms and reactive silanols on silicon-containing layer surfaces with large alkyl or aryl groups. For example, such large groups may prevent water and colloidal silica particles from reacting with surface Si—OH groups. In embodiments, suitable disilanol compounds include dialkyl disilanols having a straight or branched $C_1$-$C_{20}$ alkyl group, such as di-tert-butyl disilanol and di-isopropyl disilanol, and diaryl disilanols having any suitable aryl group such as phenyl, naphthyl or the like, such as diphenyl disilanol, and mixtures thereof.

For example, di-tert-butyl disilanol (9) is chemically stable to 200° C. and is sufficiently hindered so as not to allow attack by catalytic protons from $H_2SO_4$. Another exemplary compound that may be used in embodiments is diphenyl-disilanol (10), which is chemically stable to 130° C.).

(9)

(10)

In combination with arylamine charge transport materials, such as for example, compound (8), such sterically hindered disilanol compounds may be used to prepare silicon-containing layers having improved image deletion properties.

The sol-gel polymerization processes of embodiments may be carried out at any suitable temperature, including but not limited to room temperature (about 25° C.) or higher, such as from about 25° C. to about 200° C., from about 40° C. to about 150° C. or from about 65° C. to about 100° C.

When conducting the sol-gel process of embodiments, a catalyst may be used to facilitate polymerization. In particular embodiments, the sol-gel processes may be conducted at room temperature with an ion-exchange resin catalyst, such as AMBERLYST H15 (available from Rohm & Haas Co. Corp.). In some embodiments, polymerization may continue, even after removal of the catalyst, until the solution gels or precipitates. However, in other embodiments, the sol-gel polymerization solution may be filtered through a buffer, such as sodium bicarbonate ($NaHCO_3$), to remove the catalyst; in such embodiments polymerization may terminate on filtration and the solution may be stable for a period of time, such as up to 120 hours or more.

Once the sol-gel polymerization process of embodiments is complete, the polymerized material may be cured. For example, the polymerized material may be cured at any suitable temperature for curing the polymers, such as for example at about 140° C. Curing may be accelerated and/or enhanced by the addition of a catalyst. Suitable catalysts include but are not limited to known or later developed catalysts, such as, for example aluminum(III) acetylacetonate ($Al(AcAc)_3$) and dibutyltin(IV)dilaurylate.

While not limiting, the following provides a possible mechanism for improved image deletion properties of embodiments. Compounds such as compound (8) are known to exchange alkyl groups with $C_1$-$C_{10}$ alcohols, including for example, methanol and butanol.

Disilanol compounds of embodiments may react with each other and with compounds such as compound (11) to form oligomers, such as compounds (12) and (13), and water. The water may react with compounds (8) and (11) to form additional oligomers, such as compound (14).

embodiments, the charge-transfer substance contained in charge-transfer layer 14 may be soluble in the liquid component in the coating solution used for formation of charge-transfer layer 14.

Image-Forming Apparatus and Process Cartridge

Oligomer compounds, such as those of formulas (12), (13) and (14), may then be sol-gel polymerized to form silicon-containing layers of embodiments, which may be cross-linked and/or branched in some embodiments. Such silicon-containing layers include sterically hindered groups attached to silicon atoms, which may provide steric blocking and may prevent chemical attack and physisorption of contaminents onto the reactive silanols at the later surfaces.

Figure 2:
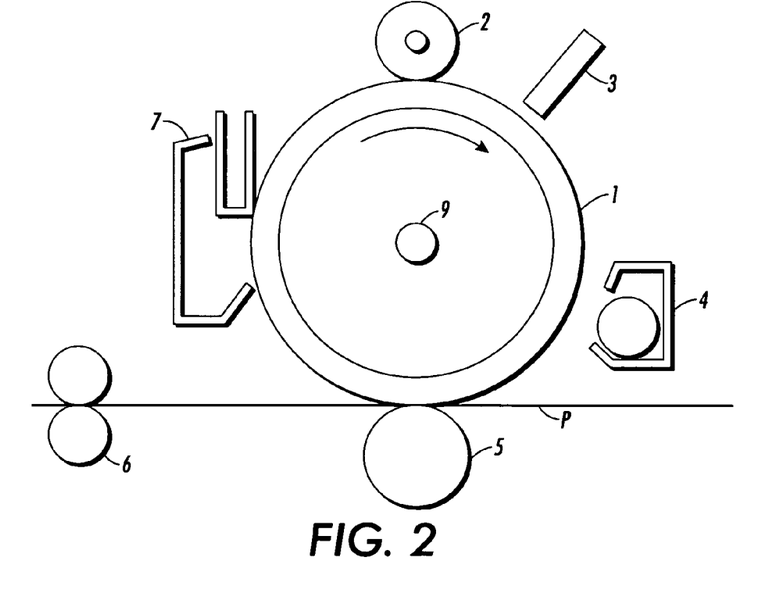
FIG. 2 is a schematic view showing an embodiment of an image-forming apparatus.

The photoreceptor of embodiments should not be construed as being limited to the above-mentioned constitution. For example, the photoreceptor shown in FIG. 1 is provided with protective layer 15. However, when charge-transfer layer 14 contains the resin soluble in the liquid component in the coating solution used for formation of this layer and the silicon compound, charge-transfer layer 14 may be used as a top surface layer (a layer on the side farthest apart from support 11) without using protective layer 15. In some FIG. 2 is a schematic view showing an embodiment of an image-forming apparatus. In the apparatus shown in FIG. 2, photoreceptor 1 constituted as shown in FIG. 1 is supported by support 9, and rotatable at a specified rotational speed in the direction indicated by the arrow, centered on support 9. Contact-charging device 2, exposure device 3, developing device 4, transfer device 5 and cleaning unit 7 are arranged in this order along the rotational direction of photoreceptor 1. Further, this exemplary apparatus is equipped with image-fixing device 6, and medium P to which a toner image is to be transferred is conveyed to image-fixing device 6 through transfer device 5.

Contact-charging device 2 has a roller-shaped contact-charging member. The contact-charging member is arranged so that it comes into contact with a surface of the photoreceptor 1, and a voltage is applied, thereby being able to give a specified potential to the surface of photoreceptor 1. In embodiments, a contact-charging member may be formed from a metal, such as aluminum, iron or copper; a conductive polymer material, such as a polyacetylene, a polypyrole or a polythiophene; or a dispersion of fine particles of carbon black, copper iodide, silver iodide, zinc sulfide, silicon carbide, a metal oxide or the like, in an elastomer material, such as polyurethane rubber, silicone rubber, epichlorohydrin rubber, ethylene-propylene rubber, acrylic rubber, fluororubber, styrene-butadiene rubber or butadiene rubber. Non-limiting examples of metal oxides that may be used in embodiments include $ZnO$, $SnO_2$, $TiO_2$, $In_2O_3$, $MoO_3$ and complex oxides thereof. Further, a perchlorate may be added to the elastomer material to impart conductivity.

Further, a covering layer may also be provided on a surface of the contact-charging member of embodiments. Non-limiting examples of materials that may be used in embodiments for forming a covering layer include N-alkoxy-methylated nylon, cellulose resins, vinylpyridine resins, phenol resins, polyurethanes, polyvinyl butyrals, melamines and mixtures thereof. Furthermore, resin emulsion materials such as acrylic resin emulsions, polyester resin emulsions or polyurethanes, may be used. In order to further adjust resistivity, conductive-agent particles may be dispersed in these resins, and in order to prevent deterioration, an antioxidant can also be added thereto. Further, in order to improve film-forming properties in forming the covering layer, a leveling agent or a surfactant may be added to the emulsion resin in embodiments.

The resistance of the contact-charging member of embodiments may be in a range of from about $10^0$ to about $10^{14}$ Ω-cm, such as from about $10^2$ to about $10^{12}$ Ω-cm. When a voltage is applied to this contact-charging member, either a DC (direct current) voltage or an AC (alternating current) voltage can be used as the applied voltage. Further, a superimposed voltage of a DC voltage and an AC voltage can also be used.

In the exemplary apparatus shown in FIG. 2, the contact-charging member of contact-charging device 2 is in the shape of a roller. However, such a contact-charging member may be in the shape of a blade, a belt, a brush or the like.

Further, in embodiments an optical device that can perform desired imagewise exposure to a surface of photoreceptor 1 with a light source such as a semiconductor laser, an LED (light emitting diode) or a liquid crystal shutter, may be used as exposure device 3.

Furthermore, a known developing device using a normal or reversal developing agent of a one-component system, a two-component system or the like may be used in embodiments as developing device 4. There is no particular limitation on toners that may be used in embodiments.

Contact-type transfer-charging devices using a belt, a roller, a film, a rubber blade or the like, or a scorotron-transfer charger or a corotron-transfer charger utilizing corona discharge may be employed as transfer device 5, in various embodiments.

Further, in embodiments, cleaning device 7 may be a device for removing a remaining toner adhered to the surface of photoreceptor 1 after a transfer step, and photoreceptor 1 repeatedly subjected to the above-mentioned image-formation process may be cleaned thereby. In embodiments, cleaning device 7 may be a cleaning blade, a cleaning brush, a cleaning roll or the like. Materials for the cleaning blade include urethane rubber, neoprene rubber and silicone rubber.

In the exemplary image-forming device shown in FIG. 2, the respective steps of charging, exposure, development, transfer and cleaning are conducted in turn in the rotation step of photoreceptor 1, thereby repeatedly performing image formation. Accordingly, even in embodiments in which the photoreceptor is used together with the contact-charging device or the cleaning blade, or further with spherical toner obtained by chemical polymerization, good image quality can be obtained without the occurrence of image defects such as fogging. That is, embodiments provide image-forming apparatuses that can stably provide good image quality for a long period of time.

Figure 3:
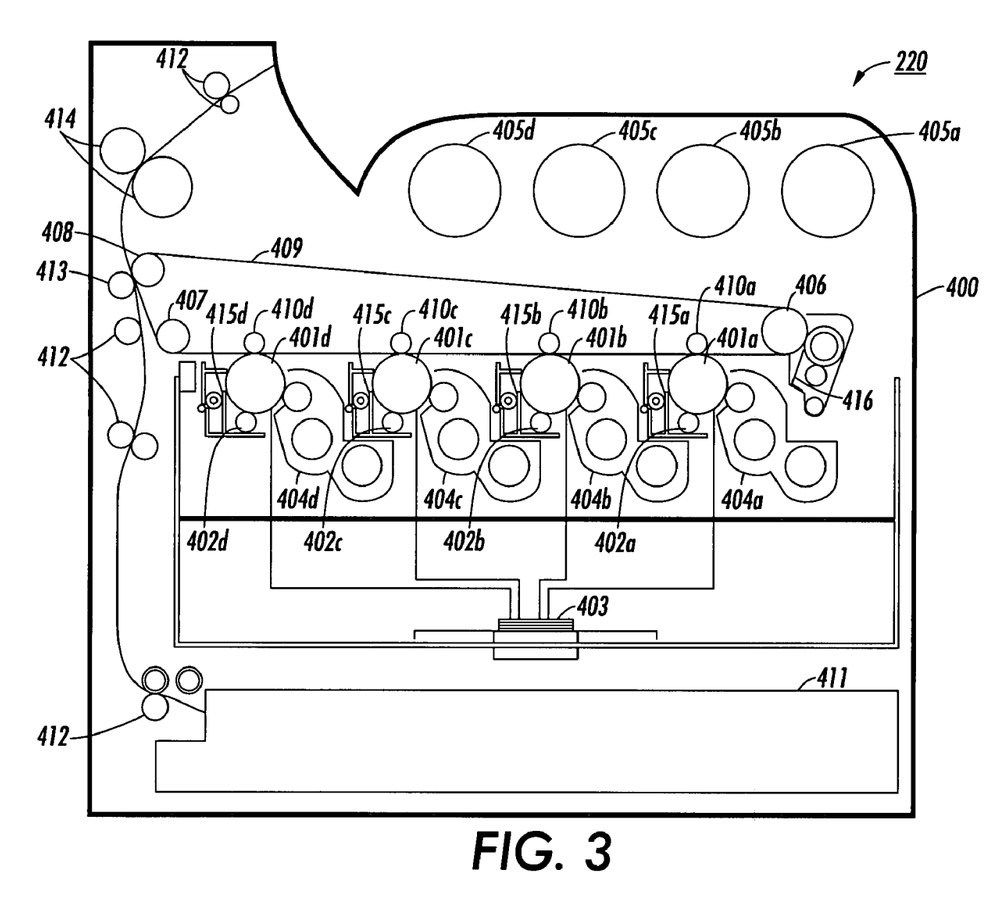
FIG. 3 is a schematic view showing another embodiment of an image-forming apparatus.

FIG. 3 is a cross sectional view showing another exemplary embodiment of an image-forming apparatus. Image-forming apparatus 220 shown in FIG. 3 is an image-forming apparatus of an intermediate-transfer system, and four photoreceptors 401a to 401d are arranged in parallel with each other along intermediate-transfer belt 409 in housing 400.

Here, photoreceptors 401a to 401d carried by image-forming apparatus 220 are each photoreceptors of embodiments. Each of photoreceptors 401a to 401d may rotate in a predetermined direction (counterclockwise on the sheet of FIG. 3), and charging rolls 402a to 402d, developing device 404a to 404d, primary transfer rolls 410a to 410d and cleaning blades 415a to 415d are each arranged along the rotational direction thereof. In each of developing devices 404a to 404d, four color toners of yellow (Y), magenta (M), cyan (C) and black (B) contained in toner cartridges 405a to 405d can be supplied, and primary transfer rolls 410a to 410d are each brought into abutting contact with photoreceptors 401a to 401d through intermediate-transfer belt 409.

Further, laser light source (exposure unit) 403 is arranged at a specified position in housing 400, and it is possible to irradiate surfaces of photoreceptors 401a to 401d after charging with laser light emitted from laser light source 403. This performs the respective steps of charging, exposure, development, primary transfer and cleaning in turn in the rotation step of photoreceptors 401a to 401d, and toner images of the respective colors are transferred onto intermediate-transfer belt 409, one over the other.

Intermediate-transfer belt 409 is supported with driving roll 406, backup roll 408 and tension roll 407 at a specified tension, and rotatable by the rotation of these rolls without the occurrence of deflection. Further, secondary transfer roll 413 is arranged so that it is brought into abutting contact with backup roll 408 through intermediate-transfer belt 409. Intermediate-transfer belt 409, which has passed between backup roll 408 and secondary transfer roll 413, is cleaned up by cleaning blade 416, and then repeatedly subjected to the subsequent image-formation process.

Further, tray 411, for providing a medium such as paper to which a toner image is to be transferred, is provided at a specified position in housing 400. The medium to which the toner image is to be transferred in tray 411 is conveyed in turn between intermediate-transfer belt 409 and secondary transfer roll 413, and further between two fixing rolls 414 brought into abutting contact with each other, with conveying roll 412, and then delivered out of housing 400.

According to exemplary image-forming apparatus 220 shown in FIG. 3, the use of photoreceptors of embodiments as photoreceptors 401a to 401d may achieve discharge-gas resistance, mechanical strength, scratch resistance, etc. on a sufficiently high level in the image-formation process of each of photoreceptors 401a to 401d. Accordingly, even when the photoreceptors are used together with contact-charging devices or cleaning blades, or further with spherical toners obtained by chemical polymerization, good image quality can be obtained without the occurrence of image defects such as fogging. Therefore, also according to the image-forming apparatus for color-image formation using the intermediate-transfer body, such as this embodiment, the image-forming apparatus which can stably provide good image quality for a long period of time is realized.

The above-mentioned embodiments should not be construed as limiting. For example, each apparatus shown in FIG. 2 or 3 may be equipped with a process cartridge comprising photoreceptor 1 (or photoreceptors 401a to 401d) and charging device 2 (or charging devices 402a to 402d). The use of such a process cartridge allows maintenance to be performed more simply and easily.

Further, in embodiments, when a charging device of the non-contact-charging system such as a corotron charger is used in place of contact-charging device 2 (or contact-charging devices 402a to 402d), sufficiently good image quality can be obtained.

Furthermore, in the embodiment of an apparatus that is shown in FIG. 2, a toner image formed on the surface of photoreceptor 1 is directly transferred to medium P to which the toner image is to be transferred. However, the image-forming apparatus of embodiments may be further provided with an intermediate-transfer body. This makes it possible to transfer the toner image from the intermediate-transfer body to medium P to which the toner image is to be transferred, after the toner image on the surface of photoreceptor 1 has been transferred to the intermediate-transfer body. As such an intermediate-transfer body, there can be used one having a structure in which an elastic layer containing a rubber, an elastomer, a resin or the like and at least one covering layer are laminated on a conductive support.

In addition, the image-forming apparatus of embodiments may be further equipped with a static eliminator such as an erase light irradiation device. This may prevent incorporation of residual potential into subsequent cycles when the photoreceptor is used repeatedly. Accordingly, image quality can be more improved.

EXAMPLES

The embodiments as discussed above are illustrated in greater detail with reference to the following Examples and Comparative Examples, but the invention should not be construed as being limited thereto. In the following examples and comparative examples, all the "parts" are given by weight unless otherwise indicated.

Example 1

Silicon-Containing Layer Formulation

For Example 1, silicon-containing layer formulations were prepared as follows:

Into a 5 L flask, 3 grams of an arylamine compound of formula (8), 3 grams of diphenyl disilanol (compound (10)), 14 grams of n-butanol, and 1 gram of an ion-exchange resin, AMBERLYST 15 (available from Rohm & Haas Co. Corp.) were combined. The reaction mixture was stirred for four hours. After four hours, the ion-exchange resin was removed by filtration.

Following filtration, the reaction mixture was stabilized by the addition of 0.06 grams of BHT and 0.06 grams of 2,6-di-tert-butyl-4-methylphenol (BHT). The reaction mixture was allowed to stabilize for one hour. Following stabilization, the reaction mixture was cured for one hour at 155° C.

Examples 2-4

Photoreceptors having Siloxane-containing Layers

The coating solution of Example 1 was coated onto a photoreceptor at three different pull rates. Table 2 shows the pull rates and coating thicknesses for each of Examples 2-4. The silicon-containing layers were determined to be within the desired coating thickness range of from about 1 to about 10 µm, such as for example, from about 1 to about 5 µm or from about 1 to about 3 µm. The silicon-coating layers were also determined to be of high quality, and were not susceptible to dissolution by methanol in combination with surface friction.

TABLE 2

|  | Pull rate (mm/min) | Coating thickness (µm) |
| --- | --- | --- |
| Example 2 | 150 | 1.69 ± 0.16 |
| Example 3 | 200 | 2.13 ± 0.08 |
| Example 4 | 250 | 2.42 ± 0.10 |

It will be appreciated that various of the above-discussed and other features and functions, or alternatives thereof, may be desirably combined into many other different systems or applications. Also that various presently unforeseen or unanticipated alternatives, modifications, variations or improvements therein may be subsequently made by those skilled in the art which are also intended to be encompassed by the following claims.

What is claimed is:

1. An electrophotographic photoreceptor comprising a silicon-containing layer, wherein the silicon-containing layer comprises sol-gel polymerization products of a mixture of one or more siloxane precursor materials, one or more disilanol compounds and one or more alcohols, and wherein the one or more disilanol compounds are selected from a group consisting of di-tert-butyl disilanol, di-isopropyl disilanol, diphenyl disilanol, and mixtures thereof.

2. The electrophotographic photoreceptor of claim 1, wherein water is present in the mixture in a ratio of disilanol compounds:water of from about 20:80 to about 100:0.

3. The electrophotographic photoreceptor of claim 1, wherein the mixture is essentially free of water.

4. The electrophotographic photoreceptor of claim 1, wherein the one or more disilanol compounds comprise diphenyl disilanol.

5. The electrophotographic photoreceptor of claim 1, wherein the one or more siloxane precursor materials comprise one or more compounds chosen from the group consisting of siloxane precursor hole-transport materials and siloxane precursor binder materials.

6. The electrographic photoreceptor according to claim 1, wherein the silicon-containing layer is a charge transfer layer of the electrophotographic photoreceptor.

7. The electrographic photoreceptor according to claim 6, wherein the siloxane precursor material is a hole-transport material of the charge transfer layer.

8. The electrographic photoreceptor according to claim 1, wherein the silicon-containing layer is a protective topcoat of the electrophotographic photoreceptor.

9. A process for preparing the electrophotographic photoreceptor of claim 1, the process comprising:

providing a mixture of one or more siloxane precursor materials, one or more disilanol compounds and one or more alcohols; sol-gel polymerizing the mixture; and solution coating the polymerized mixture to form the layer of the electrophotographic photoreceptor.

10. The process according to claim 9, wherein water is present in the mixture in a ratio of disilanol compounds:water of from about 20:80 to about 100:0.

11. The process according to claim 9, wherein the mixture is essentially free of water.

12. The process according to claim 9, wherein the one or more siloxane precursor materials comprise one or more compounds chosen from the group consisting of siloxane precursor hole-transport materials and siloxane precursor binder materials.

13. The process according to claim 9, wherein the one or more siloxane precursor materials further comprises one or more siloxane precursor binder materials.

14. The process according to claim 9, further comprising curing the coated mixture to form a cross-linked layer.

15. The process according to claim 14, wherein the curing is thermal curing.

16. The process according to claim 14, wherein the cross-linked layer is insoluble.

* * * * *